United States Patent
Dhunjishaw et al.

(10) Patent No.: US 8,799,168 B2
(45) Date of Patent: Aug. 5, 2014

(54) SECURE TRANSFER OF ONLINE PRIVILEGES INCLUDING NON-FINANCIAL OPTIONS

(75) Inventors: David Dhunjishaw, San Diego, CA (US); Christopher Yates, San Diego, CA (US); Andrew Zaffron, San Diego, CA (US)

(73) Assignee: Sony Online Entertainment LLC, San Diego, CA (US)

( * ) Notice: Subject to any disclaimer, the term of this patent is extended or adjusted under 35 U.S.C. 154(b) by 648 days.

(21) Appl. No.: 12/493,084

(22) Filed: Jun. 26, 2009

(65) Prior Publication Data

US 2009/0318221 A1 Dec. 24, 2009

Related U.S. Application Data

(63) Continuation of application No. PCT/US2008/056701, filed on Mar. 12, 2008, and a continuation-in-part of application No. 11/215,227, filed on Aug. 29, 2005.

(60) Provisional application No. 60/906,475, filed on Mar. 12, 2007, provisional application No. 60/673,042, filed on Apr. 19, 2005.

(51) Int. Cl.
*G06F 21/00* (2013.01)
*G06F 19/00* (2011.01)

(52) U.S. Cl.
USPC .............................................. 705/57; 463/42

(58) Field of Classification Search
None
See application file for complete search history.

(56) References Cited

U.S. PATENT DOCUMENTS

| | | | |
|---|---|---|---|
| 6,119,229 A * | 9/2000 | Martinez et al. | 726/28 |
| 6,202,051 B1 * | 3/2001 | Woolston | 705/26.3 |
| 6,279,112 B1 | 8/2001 | O'Toole et al. | |
| 6,669,564 B1 | 12/2003 | Young et al. | |
| 6,697,944 B1 | 2/2004 | Jones et al. | |
| 6,735,324 B1 | 5/2004 | McKinley et al. | |
| 6,884,162 B2 | 4/2005 | Raverdy et al. | |
| 6,955,605 B2 | 10/2005 | Young et al. | |
| 7,549,924 B2 | 6/2009 | Canessa et al. | |
| 7,639,251 B2 * | 12/2009 | Gu et al. | 345/419 |
| 7,666,095 B2 * | 2/2010 | Van Luchene | 463/29 |

(Continued)

FOREIGN PATENT DOCUMENTS

| | | | |
|---|---|---|---|
| JP | 2003-010552 A | 1/2003 | |
| JP | 2003-150820 A | 5/2003 | |

(Continued)

OTHER PUBLICATIONS

International Search Report and Written Opinion issued in International Patent Application No. PCT/US2005/45105 on Aug. 8, 2007.

(Continued)

*Primary Examiner* — Evens J Augustin
(74) *Attorney, Agent, or Firm* — Procopio, Cory, Hargreaves & Savitch, LLP (57) ABSTRACT

A method of transferring online privileges, comprising: receiving a request for a payment including one or more non-financial items; debiting the one or more non-financial items from a second account; and crediting the one or more non-financial items to a first account, wherein the first account and the second account are accounts residing in a points server.

9 Claims, 7 Drawing Sheets

(56) References Cited

U.S. PATENT DOCUMENTS

| | | | |
|---|---|---|---|
| 7,675,519 B2* | 3/2010 | Tobias | 345/473 |
| 7,677,973 B2* | 3/2010 | Van Luchene | 463/29 |
| 7,686,691 B2* | 3/2010 | Van Luchene | 463/29 |
| 7,690,990 B2* | 4/2010 | Van Luchene | 463/25 |
| 7,828,655 B2 | 11/2010 | Uhlir et al. | |
| 7,846,014 B2* | 12/2010 | Shelton | 463/9 |
| 7,874,921 B2 | 1/2011 | Baszucki et al. | |
| 7,895,076 B2* | 2/2011 | Kutaragi et al. | 705/14.41 |
| 7,966,567 B2* | 6/2011 | Abhyanker | 715/757 |
| 8,016,678 B1* | 9/2011 | Hutter et al. | 463/42 |
| 8,016,680 B1* | 9/2011 | Hutter et al. | 463/42 |
| 8,019,797 B2* | 9/2011 | Hamilton et al. | 707/809 |
| 8,052,520 B2* | 11/2011 | Park | 463/42 |
| 8,090,618 B1* | 1/2012 | Chu | 705/26.1 |
| 8,105,162 B2* | 1/2012 | Uchibori et al. | 463/31 |
| 8,133,116 B1* | 3/2012 | Kelly et al. | 463/31 |
| 8,137,193 B1* | 3/2012 | Kelly et al. | 463/31 |
| 8,137,194 B1* | 3/2012 | Kelly et al. | 463/31 |
| 8,140,982 B2* | 3/2012 | Hamilton et al. | 715/757 |
| 2001/0056383 A1 | 12/2001 | Shuster | |
| 2002/0068631 A1 | 6/2002 | Raverdy et al. | |
| 2002/0072412 A1 | 6/2002 | Young et al. | |
| 2002/0169706 A1 | 11/2002 | Chandra et al. | |
| 2003/0032476 A1 | 2/2003 | Walker et al. | |
| 2003/0032746 A1* | 2/2003 | Schwindeman et al. | 526/178 |
| 2003/0046221 A1* | 3/2003 | Hora | 705/37 |
| 2004/0043806 A1 | 3/2004 | Kirby et al. | |
| 2004/0102248 A1 | 5/2004 | Young et al. | |
| 2005/0033601 A1 | 2/2005 | Kirby et al. | |
| 2005/0038707 A1* | 2/2005 | Roever et al. | 705/21 |
| 2005/0038724 A1 | 2/2005 | Roever et al. | |
| 2005/0143174 A1* | 6/2005 | Goldman et al. | 463/42 |
| 2005/0192071 A1* | 9/2005 | Matsuno et al. | 463/1 |
| 2005/0287925 A1 | 12/2005 | Proch et al. | |
| 2006/0035692 A1 | 2/2006 | Kirby et al. | |
| 2006/0234795 A1* | 10/2006 | Dhunjishaw et al. | 463/42 |
| 2006/0258447 A1 | 11/2006 | Baszucki et al. | |
| 2007/0060315 A1* | 3/2007 | Park | 463/25 |
| 2009/0023487 A1 | 1/2009 | Gilson et al. | |
| 2009/0318221 A1 | 12/2009 | Dhunjishaw et al. | |
| 2009/0327723 A1 | 12/2009 | Yates et al. | |
| 2010/0029380 A1 | 2/2010 | Rhoads et al. | |

FOREIGN PATENT DOCUMENTS

| | | |
|---|---|---|
| JP | 2003-242383 A | 8/2003 |
| JP | 2003-526833 A | 9/2003 |
| JP | 2004-086315 A | 3/2004 |
| JP | 2006-053809 | 2/2006 |
| JP | 2006-218223 A | 8/2006 |
| KR | 10-2001-0112199 A | 12/2001 |
| KR | 10-2003-0097465 A | 12/2003 |
| KR | 10-2004-0032010 A | 4/2004 |
| KR | 10-2004-0043943 A | 5/2004 |
| KR | 10-2005-0029048 A | 3/2005 |
| KR | 10-2005-0059347 A | 6/2005 |
| KR | 10-2007-0010885 A | 1/2007 |
| WO | 00/50974 A2 | 8/2000 |
| WO | 2006/080772 A1 | 12/2005 |
| WO | 2006/112893 A2 | 10/2006 |

OTHER PUBLICATIONS

Castronova, E. Virtual Worlds: A First-Hand Account of Market and Society on the Cyberian Frontier. CESifo Working Paper No. 618 [online], Dec. 2001 [retrieved Apr. 18, 2007], Retrieved from the Internet: URL: <http://papers.ssm.com/sol3/papers.cfm?abstract_id=294828>.

International Search Report and Written Opinion issued in International Patent Application No. PCT/US2008/056701 on Jan. 22, 2009.

Nathan Pearce and Eric Schrnitter, "Station Auctions Design Document," Sony Online Entertainment Inc., Version 2.00, Feb. 14, 2005.

Internet website http://news.com/Real+cash+for+virtual+goods/2100-1043_3-5566704.html?tag=st. rn.

Internet website http://news.com/Second+Life+membership+now+free/21001043_3-5855481.html?tag=nefd.top.

Internet website http://www.columbiahouse.com/ circa 1996 as made available on the Internet Archive (http://www.archive.org).

Supplementary European Search Report issued in related European Patent Application No. 08799844.9, on Apr. 20, 2011, 7 pages.

International Search Report and Written Opinion issued in PCT/US2008/056701, mailed on Jan. 22, 2009, 7 pages.

Supplementary European Search Report issued in related European Patent Application No. 08743800.8 on Feb. 2, 2011, 4 pages.

EPO, "Notice from the European Patent Office dated Oct. 1, 2007, concerning business methods," Nov. 1, 2007, Official Journal of the European Patent Office, Munich, XP007905525, ISSN: 0170-9291, pp. 592-593.

International Search Report and Written Opinion issued in PCT/US2008/056691, mailed on Aug. 5, 2008, 6 pages.

Nakajima, W., et al., "Depth Fantasia Official Guide" Softband PPublishing Inc. May 22, 2002, Second edition, pp. 19 and 23.

Tetra Master, LOGiN, Enterbrain, Inc. Nov. 1, 2001, vol. 20, No. 11, pp. 64.

* cited by examiner

SECURE TRANSFER OF ONLINE PRIVILEGES INCLUDING NON-FINANCIAL OPTIONS

CROSS-REFERENCE TO RELATED APPLICATIONS

The present application claims priority pursuant to 35 U.S.C §120 as a continuation application of co-pending PCT Application Ser. No. PCT/US08/56701, filed Mar. 12, 2008, entitled "Secure Transfer of Online Privileges including Non-Financial Options" which claimed the benefit of priority of U.S. Provisional Patent Application Ser. No. 60/906,475, filed Mar. 12, 2007. The present application is also a continuation-in-part application of co-pending U.S. patent application Ser. No. 11/215,227, filed on Aug. 29, 2005, entitled "System for Secure Transfer of Online Privileges", which claimed the benefit of priority of U.S. Provisional Patent Application Ser. No. 60/673,042, filed Apr. 19, 2005. The disclosures of the above-referenced patent applications are hereby incorporated by reference.

BACKGROUND

Online auctions on the Internet for real-world items have become popular in the past decade. Many people enjoy being able to offer goods to be sold to the very large pool of potential buyers accessible via the Internet while others enjoy being able to purchase many types of goods from so many potential sellers. Most items sold are typical of what might be sold at live auctions, stores, yard sales, and so on. However, as the popularity of online auctions has grown, buyers and sellers have sometimes attempted to sell items that are less ordinary.

Another burgeoning activity is online gaming, such as through the Internet. Some online games are role-playing games (or RPG's) for very large numbers of players (sometimes called MMOG's, for "massively multiplayer online games," or MMORPG's). These include, for example, the Everquest™ games by Sony Online Entertainment Inc., where a player controls a game persona or character. In the course of the game, a character can acquire various game items, such as money, weapons, equipment, and so on. These game items are represented by data stored for the game, and are not actual physical items (other than the data). When a character has a game item in the game, the game indicates the relationship through the manipulation of data in the game and the character has access to certain privileges associated with that item (e.g., can use an object, wield a weapon, or spend money). Some game items are very rare or difficult to obtain in the game, requiring great skill or effort to acquire. These types of game items can be very desirable for players of the game. Characters in the game can acquire game items from one another, such as by trading one game item for another (e.g., paying game money to buy a game weapon), and so gain access to the privileges of new game items. The game system controls the data representing the characters and the items and so the game controls the transfer of a game item in the game.

At a new nexus of these two areas, some players of online games attempt to sell game items for real money using online auctions, similar to selling ordinary physical items. In this way a player may acquire a game item without having to obtain it in the ordinary course of the game. Typically, these independent "sales" have not been authorized or supported by the game providers and so the players experience problems when attempting to perform these unauthorized transactions. For example, because the players do not own the online items they do not have full control over their disposition and so have difficulty in establishing a reliable or secure transfer.

Additionally, arranging a secure exchange of real money for a game item can be difficult. Because a player typically does not have control over the data in the game, an online auction similarly has no control over the game item data either. Further, while the players may agree to the transfer, an unscrupulous player may try to take advantage by not performing. Hence, it may be difficult for the buyer to ensure that both the buyer (or, the buyer's game character) will actually receive the game item in the game and that the seller will actually receive real world compensation in return.

SUMMARY

Implementations of the present invention provide for transferring online privileges using payments comprising non-financial items transferred from a first user account to a second user account.

In one implementation, the method includes: selecting a game item in an online game provided by a game server, wherein the game item is represented by item data stored in a game database connected to the game server, the item data is associated with a first user account, and the item data has an associated privilege in the online game; retrieving the item data from the game database; transferring auction item data and a first user identifier to an auction server, wherein the auction item data corresponds to the item data and the first user identifier corresponds to the first user account; disabling the item data stored in the game database so that the privilege is not available in the online game; storing the transferred data in an auction database connected to the auction server; presenting an auction for the game item at the auction server; accepting one or more bids at the auction server for the game item; determining a winning bid for the game item from among accepted bids, the winning bid indicating a second user identifier and the second user identifier corresponding to a second user account with the game server; transferring one or more non-financial items based on the winning bid from an account indicated by the second user identifier to an account indicated by the first user identifier; updating the item data stored in the game database so that the item data is associated with the second user account; and enabling the item data stored in the game database so that the privilege is available in the online game.

In another implementation, a method of transferring online privileges includes: receiving a request for a payment including one or more non-financial items; debiting the one or more non-financial items from a second account; and crediting the one or more non-financial items to a first account, wherein the first account and the second account are accounts residing in a points server.

In another implementation, a system for transferring online privileges includes: a game server having a network connection and storing data providing an online game and game environment; a game database connected to the game server, the game database storing data representing one or more game items, data representing a first user game account, and data representing a second user game account, the game item associated with the first user game account; an auction server having a network connection and connected to the game server though the network connections, and storing data providing an online auction for game items; an auction database connected to the auction server, the auction database storing data representing one or more game items received from the game server, data representing a first user auction account, and data representing a second user auction account; a points server having a network connection and connected to the auction server though the network connections, and storing data providing an online payment service for the one or more game items; and a points database connected to the points server, the points database storing data representing a first user points account, and data representing a second user points account, the first and second user points accounts used to store one or more non-financial items.

In yet another implementation, a system for transferring online privileges includes: a network interface to provide a network connection, to receive requests via the network connection for one or more non-financial payment transactions, and to send one or more notices via the network connection; a points database to store data used for the one or more non-financial payment transactions, and to maintain two or more points accounts; and a transaction control to facilitate the one or more non-financial payment transactions, including transferring at least one non-financial item from a second points account to a first points account.

DETAILED DESCRIPTION

The present invention provides for transferring privileges in one computer system based on a transaction involving a second computer system. In one implementation, an online game system transfers privileges for a game item from a first character to a second character based on an online auction and payment of money from a buyer to a seller. In another implementation, a technique for supporting transfer of items or privileges using financial and/or non-financial exchanges is disclosed. For example, a combination of online service providers cooperate to support the transfer of use of items or characters in an online game between two players in exchange for the transfer of other online items, such as points stored by a points server, through an auction mechanism.

Features provided in implementations also include, but are not limited to, one or more of: secure transfer of online items, exchanging online items for online items; auction of online items for online items; transacting payments with non-financial items, and use of a combination of financial payment, non-financial payment, physical items, and online items for payment in an online auction or sale system.

An illustrative example describing an implementation is presented below. This example is not exhaustive and additional implementations, examples, and variations are also described later.

In one example, an online service company has established an auction system for secure transfers of online privileges. The auction system facilitates the transfer of online privileges for money (e.g., U.S. dollars).

The online company also has established an online game system. A player in the game has control over game items such as characters, objects, money, or locations. The player does not own that data representing items or own any rights in the data or items. The online company allows the player to use the items in the game as part of the game service provided through the game system. A player can place one of these items from the game up for sale in the auction system. The player cannot actually sell the item (it does not exist) and cannot sell the data or any rights (the player does not have any ownership), so the selling player is selling that player's use and control privileges for that item in the online game (as defined by the online company). The online company will disable the privileges from the seller and add the privileges to the account for the purchaser of the item so that the purchaser gains those privileges in the game. For example, a player has acquired 100 gold coins in the game. The player can sell the use of those coins to another player in the auction system. After the transaction, the selling player loses the use of the coins and the purchasing player then can use those coins in the game.

In one example of the operation and interaction of these systems, the game system includes one or more game servers with Internet connections. The game servers operate to provide a game environment to users logged into the system through the Internet. The game servers are connected to one or more databases storing data representing user information and game assets, including data for items for which players can gain online privileges. The auction system includes a server with an Internet connection. The auction system operates to provide an auction service to users logged into the system. The auction system also includes one or more databases storing data representing user information and game assets. The user information includes financial information for a user to accomplish the transfer of money, such as account information with a financial service (e.g., a credit card or PayPal™). The auction system communicates with the game system over a network, such as through a secure connection established over the Internet.

To transfer a privilege, a user that is logged into the game system selects an item in the game and indicates that item is to be auctioned through the auction system. The game system sends a complete copy of data for the selected item to the auction system to be stored in a database of the auction system. The auction system builds an auction profile for the item, including information associating the item with the auctioning user. The game system deletes the data for the item in the game system's database, including the user's privileges for that item in the game. The game system sends a message (e.g., an email) to the user to inform the user that the item is ready for auction in the auction system.

The user logs into the auction system and accesses the auction profile for the transferred item. The user sets desired auction parameters, such as length of the auction, starting price, a reserve price (minimum acceptable price to complete transfer), and an instant purchase price (price that immediately ends auction, higher than the reserve price). The user confirms the user's financial account information and how the user would like to receive payment. When the user is satisfied with the auction setup, the user confirms that the auction is to begin. A listing fee may be charged to the user for placing the item up for bid. If the user will be charged an auction listing fee, the user confirms the charge at this time as well.

When the auction begins, the auction system initiates an auction process allowing users logged into the system to place and review bids for the item. Users of the auction system can log in and browse or search through items placed up for auction. A user can review the information for the item that was sent from the game system and place a bid through the auction system. When a bid is placed by a bidding user, the auction system verifies that the financial information for the bidding user is valid. The auction system also verifies with the game system that the bidding user has a valid account with the game system to receive the item. After verifying the bid, the auction system accepts and records the bid. Other users can then place additional bids. The auction ends when the time period expires or a bid matching the instant purchase price is accepted.

When the auction ends, the auction system determines if the highest accepted bid meets the reserve price (an instant purchase price, if established, is above the reserve price). If the highest accepted bid is at or above the reserve price, the auction is successful and the user that placed the winning bid will receive the purchased privilege—use of the auctioned item in the game. The auction system completes the financial transfer from the purchasing user's account to the auctioning user's account. As soon as the auction system confirms the financial transaction has completed or is approved, the auction system sends a copy of the data for item back to the game system with information indicating the purchasing user, such as the purchasing user's game identification information. The game system restores the item in the game environment and updates the user information of the purchasing user. The game system sends notification messages to the selling user and the purchasing user. When the selling user logs into the game system again, the selling user will not be able to use the item. When the purchasing user logs into the game system again, the purchasing user will be able to use the item.

If the highest accepted bid is below the reserve price, the auction is not successful and the user that placed the item up for auction will retain the privilege—use of the auctioned item in the game. The user can request a new auction and begin the setup process again. If the user decides not to request a new auction, the auction system sends a copy of the data for item back to the game system with information indicating the auctioning user. The game system restores the item in the game environment and updates the user information of the auctioning user. The game system sends an email confirmation notice to the user. When the auctioning user logs into the game system again, the auctioning user will be able to use the item.

In this example, the online company facilitates the transfer of privileges for game items between users. The users are assured that the transfer will occur and that the item in question is what it is purported to be. The online company enhances the game experience for its users and so improves its business.

Figure 1:
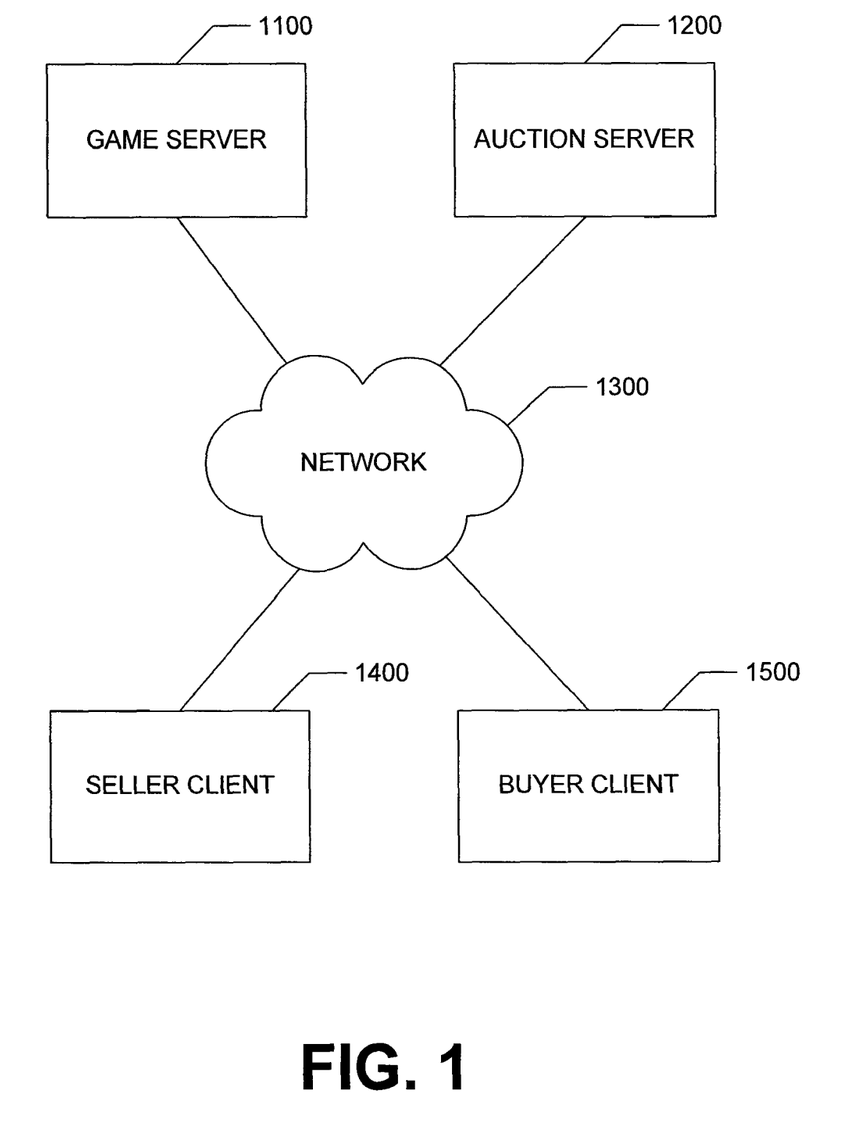
FIG. 1 shows a representation of one implementation of a system for transferring privileges.

Referring now to the figures, FIG. 1 shows a representation of one implementation of a system for transferring privileges. A game server 1100 is connected to an auction server 1200 through a network 1300. A seller client 1400 and a buyer client 1500 are also connected to the network 1300.

The game server 1100 is a network server system including computer hardware and software to support the operation of and storage for an online game environment and game play, such as that used to support MMORPG's. The game server 1100 supports one or more online games and provides an interface to each game for clients connected to the game server 1100 through the network 1300. The game server 1100 stores data representing game environments and game items, and data for user accounts. A player of a game has a corresponding user account stored on the game server 1100 (or multiple accounts).

The auction server 1200 is a network server system including computer hardware and software to support the operation of and storage for an online auction service, such as that used to support online auctions. The auction server 1200 supports auctions for buyers and sellers and provides an interface to the auctions for clients connected to the auction server 1200 through the network 1300. The auction server 1200 stores data representing the auctions and items being auctioned, and data for user accounts. A buyer or seller has a corresponding user account stored on the auction server 1200 (or multiple accounts).

The network 1300 is a computer network, such as the Internet, providing direct and/or indirect network connections between devices connected to the network 1300. In other implementations, different or additional networks can be used, such as a phone network or a private network.

The seller client 1400 is a computer system, such as a desktop or laptop computer, or a game console. The seller client 1400 stores and executes client software to interact with the game server 1100 and the auction server 1200. Game client software supports playing an online game provided by the game server 1100. Auction client software supports requesting and participating in online auctions provided by the auction server 1200. In one implementation, the game client software and the auction client software are integrated into one application program or application suite. The buyer client 1500 is a computer system similar to the seller client 1400. In another implementation, one (or both) of the clients is a different type of computer system, such as a portable device (e.g., a PDA or portable game device) or mobile phone including appropriate client software (e.g., a limited version of the regular game client software so that a subset of game features can be accessed). In one such implementation, the game server and auction server provide different levels of access to different types of client systems.

The configuration and relationship of the game server and auction server are flexible and can vary in different implementations. In one implementation, the game server and the auction server are parts of the same system, or share some components (e.g., share storage, but have separate network interfaces). In one such implementation, the game server operates an auction for players in the game and the auction server provides an interface to that auction for users outside the game. In another implementation, the game server and auction server are operated by different companies. In one such implementation, one company operates a game server and the auction server and a second company operates a different game server for a different game. In this situation, the auction server can support auctions for game items from either game.

Figure 2A:
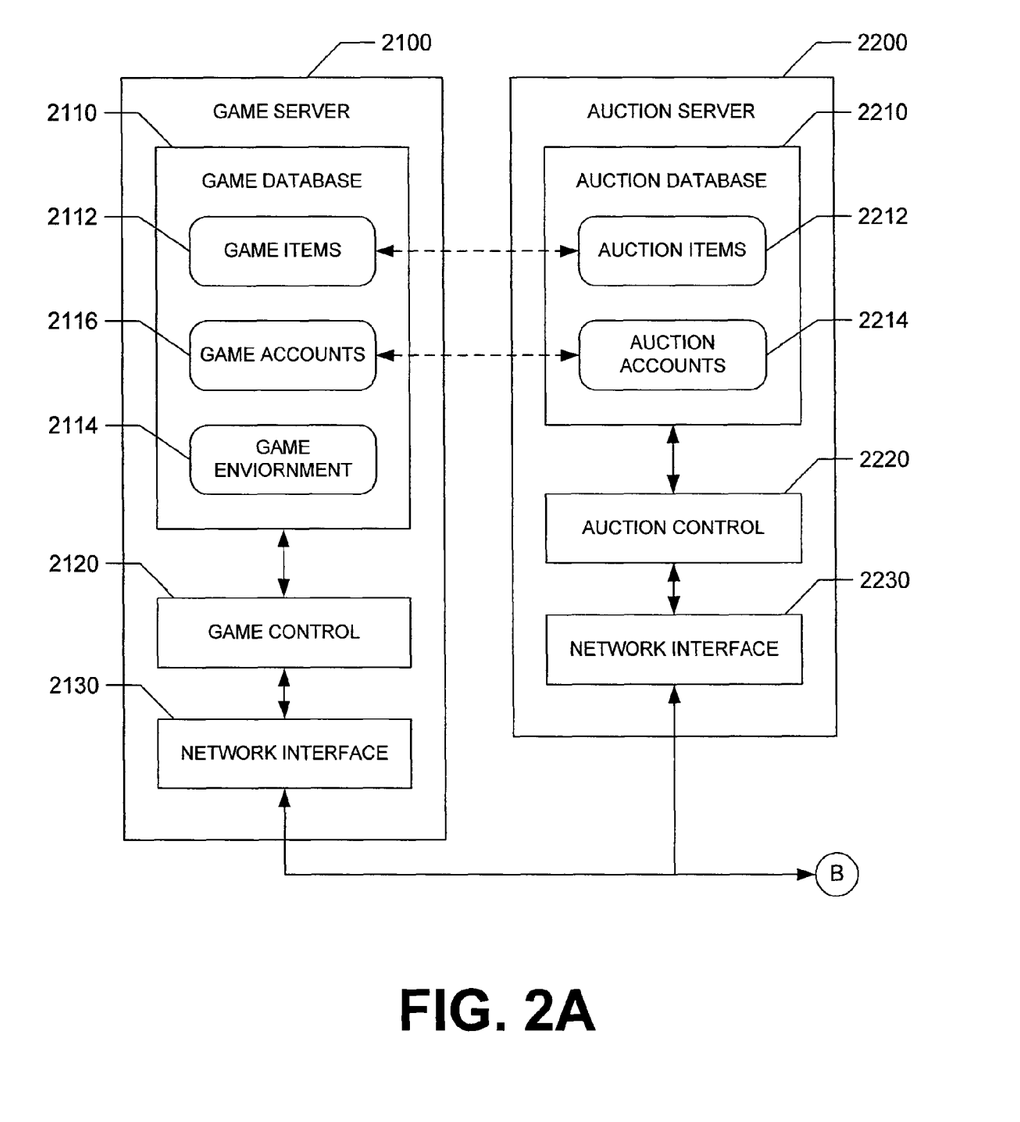
FIG. 2A shows a functional block diagram of one implementation of a game server and an auction server.

FIG. 2A shows a block diagram of one implementation of a game server 2100 and an auction server 2200. The game server 2100 is a network computer system and includes a game database 2110, a game control system 2120, and a network interface 2130. Alternatively, the game database can be external. The auction server 2200 is a network computer system and includes an auction database 2210, an auction control system 2220, and a network interface 2230. Alternatively, the auction database can be external. In another implementation, either or both servers include multiple server systems (e.g., to distribute processing and storage for load balancing). Both servers 2100, 2200 include additional hardware and software typical of computer server systems (e.g., power and a user interface), though these components are not specifically shown in FIG. 2A for simplicity. In another implementation, the servers share components (e.g., using a common database).

In the game server 2100, the game database 2110 is a storage system, such as one or more hard drives (e.g., a RAID system). The game database 2110 stores data used in and for an online game (or for multiple games). Some of the data represents game items 2112 that are assets available as part of the game, such as characters, objects, places, and so on. A game item has one or more privileges and the data for a game item indicates any privileges associated with that game item. The privileges of an item are the functions or operations allowed by possessing that item. For example, a weapon game item has defined characteristics (e.g., amount of damage inflicted). A coin or money game item has a value in the game economy and can be spent or traded (e.g., 100 coins can buy a loaf of bread), though that value may fluctuate. The data for a character game item indicates what other game items are possessed by the character in the game (e.g., what equipment the character has). When a character has a game item in the game, the character has access to the privileges associated with that game item (possibly subject to other game conditions). In another implementation, game items include abstract items, such as memberships, levels of membership, titles, or names. In another implementation, game items have subsets of features or privileges that can be divided (e.g., rooms in a house). The data for a game item also includes an identifier for the item. In one implementation the data for a game item includes a key or digital signature to verify that the data is data from the game server (e.g., when the data for the game item is passed back and forth with the auction server).

Game items can be acquired or traded within the game by characters. Alternatively, players outside the game environment can trade items using the game server (e.g., in a defined player interface for player-to-player interaction). In one implementation, users do not own the game items; they merely have limited rights to use the game items in accordance with a license agreement (which may or may not incorporate other rules) promulgated by the owner of the online game. In another implementation, users may own some or all of the game items.

Some data also represents the game environment 2114, such as video and audio data to present the game items 2112 and game locations (some of which may be game items), and data used to implement the game (e.g., state information and physics information). Some data represents user game accounts 2116 for users registered with the game server 2100, such as identifier, name, security information, billing information, financial account information (e.g., banking, credit card, online funds transfer such as PayPal™), and game items 2112 associated with the game account 2116.

The game control system 2120 controls the operation of the online game supported by the game server 2100. In one implementation, the game control system 2120 is integrated with the general control system for the game server 2100 that controls the operation of the game server 2100 (not shown in FIG. 2A). The game control system 2120 includes hardware and software to store and execute the game software providing the online game. The control system 2120 accesses and modifies the data stored in the game database 2110 in the course of executing the game software.

The network interface 2130 in the game server 2100 provides one or more connections to a network (e.g., the Internet) to connect the game server 2100 to other servers (e.g., the auction server 2200 or financial servers) and to clients (e.g., client systems playing the online game).

In the auction server 2200, the auction database 2210 is a storage system, such as one or more hard drives (e.g., a RAID system). The auction database 2210 stores data used in and for an online auction (or for multiple auctions). Some of the data represents auction items 2212 that are up for sale in an auction, such as physical objects or services, and game items 2112 from the game server 2100. Some data represents user auction accounts 2214 for users registered with the auction server 2200, such as identifier, name, security information, billing information, financial account information (e.g., banking, credit card, online funds transfer such as PayPal™), and auction items 2212 associated with the auction account 2214.

The auction control system 2220 controls the operation of the online auction supported by the auction server 2200. In one implementation, the auction control system 2220 is integrated with the general control system for the auction server 2200 that controls the operation of the auction server 2200 (not shown in FIG. 2A). The auction control system 2220 includes hardware and software to store and execute the auction software providing the online auction. The control system 2220 accesses and modifies the data stored in the auction database 2210 in the course of executing the auction software.

The network interface 2230 in the auction server 2200 provides one or more connections to a network (e.g., the Internet) to connect the auction server 2200 to other servers (e.g., the game server 2100 or financial servers) and to clients (e.g., client systems reviewing or participating in auctions).

The game server 2100 and the auction server 2200 communicate by exchanging data through their network interfaces 2130, 2230. As described below, in the course of an auction for a game item, data for the game item and data for the game account associated with the game item is transferred back and forth between the two servers 2100, 2200, represented by the dashed lines in FIG. 2A.

Figure 3A:
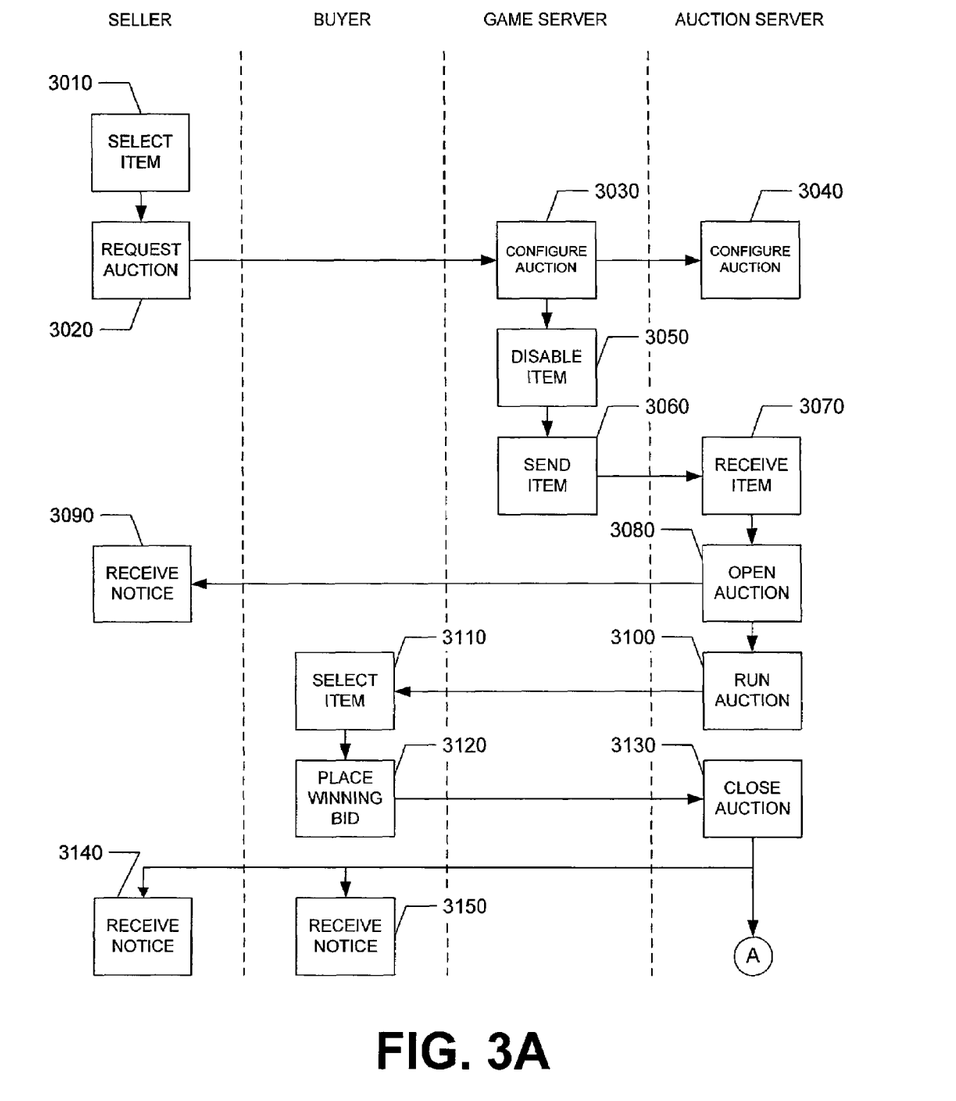
FIGS. 3A and 3B show a flowchart of one implementation of transferring a privilege by conducting an auction for a game item having that privilege.
Figure 3B:
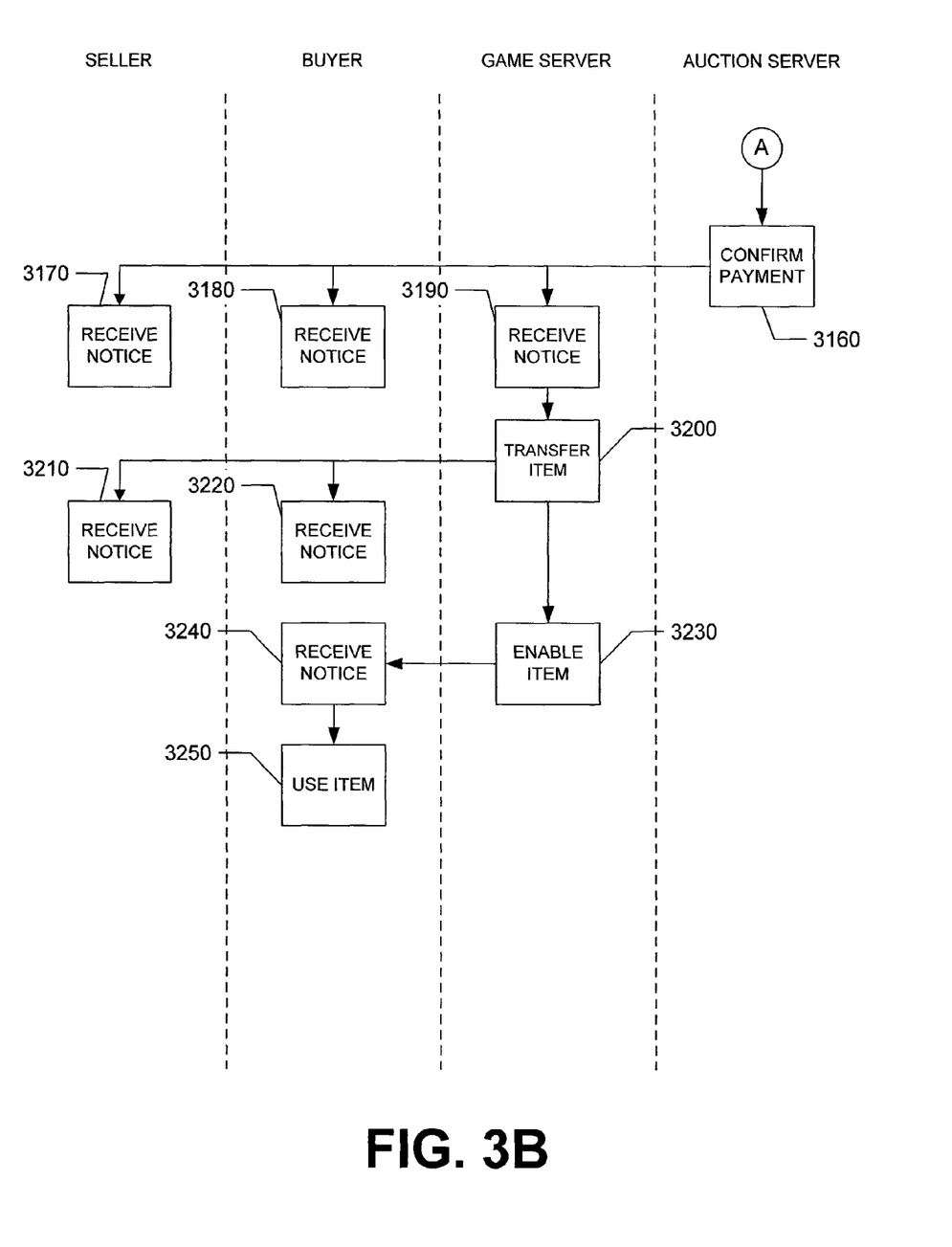

FIGS. 3A and 3B show a flowchart of one implementation of transferring a privilege by conducting an auction for a game item having that privilege. In FIGS. 3A and 3B, various actions and events are represented by labeled blocks, described below. In addition, the blocks are positioned in columns to reflect which party is taking the action. Initially, a game server is providing an online game and has stored data representing various game items and privileges associated with the game items. Game users can connect to and interact with the game server through the Internet using game client software. A first user (the "seller") is executing game client software on a computer system and has established a network connection between the computer system and the game server. The seller has a game account with the game server and is playing the online game using that account. The game account has associated with it multiple game items (e.g., characters controlled by the seller and game items possessed by those characters in the game). The seller has decided to auction one of the seller's game items through the auction server. The auction server is providing an online auction service through a website. Auction users can connect to and interact with the auction server over a network, such as through the Internet using a web browser. In another implementation, the game server provides an auction interface, either in the game or outside the game, accessible through the game client software. The game server auction interface can also be accessible through other network software, such as a web browser (e.g., allowing players in the game and non-players to participate in the auction; or allowing partial access to the auction through a web browser, so that a player can view the auction but not bid while outside the game).

The seller selects a game item to auction through the seller's computer system, block 3010, and requests an auction for the selected game item, block 3020. The game server selects the indicated item and confirms that the game item is associated with the seller's game account. The game server does not permit the seller to auction game items that are not associated with the seller's game account and rejects such requests. The seller makes the selection and request from inside the game (that is, while playing the game), such as by having the character enter an auction house in the game and present an item to an auctioneer. Alternatively, the seller can use an auction interface provided by the game server that operates outside of the game (e.g., similar to a login interface) or indirectly through an interface provided by the auction server. In another implementation, the seller can select a subset of privileges or partial use of a game item as the subject of an auction. For example, a seller may select to rent out a room of a house or auction the use of a weapon for one month.

After confirming the auction request, the game server negotiates auction parameters with the seller, block 3030. The auction parameters indicate how the auction is to be performed, such as auction form, starting price, reserve price, time limit, etc. Once the seller confirms the auction parameters, the game server provides the auction parameters to the auction server and the auction server begins setting up the auction, block 3040. The auction server confirms that the seller has an account with the auction server (or creates one if not) and associates the auction with that account. The auction server builds an announcement for the auction so that users of the auction server can be informed.

The game server then retrieves or accesses the data for the game item and disables the selected game item, block 3050. Once a seller places an item up for auction, the seller no longer has access to the privileges of the item, unless the auction fails. In one implementation, that game item is removed from the game (destroyed) and the data for the game item is stored in a separate location (or no longer associated with the seller's character or user account; the game server maintains information indicated from which seller a game item was taken to be able to return the item if the auction fails). In another implementation, the game item is disabled so that it can no longer be used in the game (e.g., using a flag or list), but the item is not removed from the game.

The game server sends a copy of the data for the game item to the auction server, block 3060, and the auction server receives and stores the data, block 3070. The game server sends an identifier with the data for the game item to identify the auction account of the seller (or to identify the seller to the auction server so the auction server will find the seller's auction account). In one implementation, the game server uses a secure connection to transfer the data to the auction server. In another implementation, the game server encrypts some or all of the game item data using a key before sending the data (e.g., to prevent the data from being altered while outside the game server). In another implementation, the game server sends only part of the data for a game item to the auction server, or sends a reference to the data stored by the game server (e.g., a pointer or index; convenient when the game server and auction server share storage). The auction server associates the data for the game item with the auction information previously received. In another implementation, the game server sends the auction parameters and information to the auction server with the data for the game item instead of separately.

The auction server opens and presents the auction according to the received parameters, block 3080. If there is a specific opening time requested, the auction opens at that time. The auction server can have additional parameters set by the auction server on how to run the auction (e.g., minimum bid increment, how to end the auction, extending the auction time limit when bids are received near the end of the time limit). The auction server sends a notification to the seller that the auction is now open, block 3090. In one implementation, the auction server sends an email message to the seller. In other implementations, different or additional notification modes can be used, such as instant messaging, an in-game message from the game server, a pop-up dialog, and so on.

The auction server proceeds to run the auction according to the auction parameters, block 3100. The auction server provides information to reviewing auction users and reviews and accepts bids as they are presented. In one implementation, the auction server requires a confirmation of available funds before accepting a bid.

A second user (the "buyer") opens a connection to the auction server and selects the game item up for auction, block 3110. The buyer is executing a web browser on a computer system and has established a network connection between the computer system and the auction server. The buyer has an auction account with the auction server and is interested in buying the selected item. The buyer also has a game account with the game server (if the buyer does not have a game account and does not create one, the auction server will retain the data for the game item in the buyer's auction account; the buyer could then re-auction the game item, such as to another player of the game). The buyer places a bid that the auction server accepts and determines is the winning bid for the game item, block 3120. The auction server accepts the winning bid and closes the auction, block 3130. The auction server determines that the buyer's bid is the winning bid according to the auction parameters (e.g., the buyer's bid is submitted before the end of the auction, the bid is higher than a set reserve price, and the bid is the highest bid made during the auction). The auction server notifies the seller that the auction is closed, block 3140. In one implementation, the auction server also informs the seller of the buyer's identity. The auction server notifies the buyer that the auction is closed and that the buyer has placed the winning bid, block 3150.

After closing the auction, the auction server confirms payment from the buyer to the seller, block 3160. In one implementation, the auction server facilitates a transfer of funds (e.g., in U.S. dollars) from the buyer to the seller (e.g., by providing appropriate information to an online funds transfer system, such as PayPal™). In another implementation, the auction server uses the auction accounts to store financial information, such as credit card and banking information, to cause a transfer of money or direct payment. In another implementation, the auction server credits and debits balances of the seller's and buyer's auction accounts or provides the information to the game server so the game server can credit and debit balances of the seller's and buyer's game accounts (e.g., to be applied against fees for using the online game or for additional services provided by the game server, such as enhanced privileges or storage). In another implementation, the payment is made in game currency for the game provided by the game server and so the game server confirms the "payment" (e.g., the auction server is acting as an out-of-game auction site or second interface to auctions for the in-game economy, or a player can sell game items to the operator of the game server for real money). In another implementation, the auction server deducts a service fee from the payment and retains that fee.

If the payment is confirmed, the auction server notifies the seller, block 3170, the buyer, block 3180, and the game server, block 3190, that the auction succeeded and that payment has been confirmed. The seller receives the agreed upon money from the buyer through the appropriate mechanism (as described above). The auction server sends the buyer's identifier back to the game server with the confirmation to confirm which auction succeeded. The auction server also sends an identifier to the game server to identify the game account of the buyer (or to identify the buyer to the game server so the game server will find the buyer's auction account). In another implementation, the auction server checks with the game server whether the buyer is allowed to receive the game item (e.g., the buyer does not have a game account, or receiving a new character game item would exceed the number of characters the buyer is allowed to have) before confirming the auction has succeeded.

If the payment is not confirmed (e.g., insufficient funds), the auction server determines that the auction has failed and notifies the seller, buyer, and game server that the auction failed and that no payment will occur. In this case, the game server will return the game item to the seller in the game or offer the seller the option of setting up a new auction. In one implementation, the auction server sends the data for the game item back to the game server and the game server confirms that the data is unchanged (e.g., by checking for a key or signature or by decrypting the data).

When the game server receives confirmation from the auction server that the auction has succeeded, the game server transfers the game item from the seller's game account to the buyer's game account, block 3200. The game server updates the data for the game item to reflect the transfer to the new account (if that information is stored with item data as well). The game server notifies the seller, block 3210, and the buyer, block 3220, of the item transfer. The game server moves the data for the auctioned game item to the game account of the buyer (or moves the appropriate identifier or reference). The game server enables the game item for the buyer, block 3230, and notifies the buyer that the item is enabled and ready for use in the game, block 3240. The game server enables the game item by reversing the process of disabling described above (e.g., adjusting an enable/disable flag). When the buyer returns to the game, the buyer can use the game item and its privileges in the game, block 3250. The buyer can select the new game item and specify how to use it (e.g., which character will use an item of equipment).

The sequence shown in FIGS. 3A and 3B is one example of the process. In other implementations, different sequences can be used, such as completing the financial transaction after transferring the game item data, or revoking the transfer of game data from one game account to another if the payment later fails. In another example, notifications separated in FIGS. 3A and 3B can be combined.

In another implementation, the auction server provides a recommendation service or "wish list" for players. A player registers with the recommendation service and indicates one or more preferences. The preferences indicate a game and types of game items (or specific game items) that the player is interested in acquiring in the game. The auction server periodically checks whether an auction is open or going to open for a game item matching the supplied preferences. In another implementation, the auction server maintains a list of items up for auction and periodically checks that list. Alternatively, when a new item is up for auction, the auction server checks the preferences of players registered with the recommendation service. In another implementation, the auction server automatically generates preferences for registered players (or all players) based on the game items associated with the players' accounts (e.g., by querying the game server for player information). For example, if a player has a particular type of character in the game and that character can only use certain types of equipment, the auction server can build preferences to recommend items for auction that are usable by the character and that are more powerful (in game attributes) than those already held by the character. In another implementation, the game server provides the recommendation service instead of the auction server (or in addition to or in conjunction with the auction server). For example, the game server periodically polls the auction server for matches based on preferences received by the game server.

In an implementation of a system described above, the system uses a model that bases the transfer on the authorized exchange of use of an online item, such as a game item (e.g., equipment or game currency) or character or privilege (e.g., guild membership) for money (e.g., U.S. dollars). In another implementation, the model is the exchange of use of an online item for a non-financial item, including another online item such as game currency.

In one example of a non-financial exchange model, the buyer pays for the auctioned item using "points" stored in an account with a third party online service (e.g., using a client or server digital wallet model). Though the label "points" is used in this example, any name may be used, such as "doubloons" or "apples." In this type of a system some type of countable online item or resource is used for exchange.

In one implementation, the operations of the game server and auction server are similar to the financial model. An online game company provides an online game server that controls the use of online items in the game. When a player requests to auction a game item, the game server establishes a connection with an auction server and sets up an online auction for the use of the game item.

In this example, instead of verifying and accepting payment from a financial server (e.g., a bank, credit card service, or web-based financial account service), the auction server interacts with a points server. The points server, similar to a financial server, maintains accounts of points for users. For example, the points may be acquired by purchase using real currency, or through promotional or online activities. The points server also supports transfers of points between accounts, or to different servers that accept transfers of points or certificates of transfer which may be redeemed through the use of another server, similar to a bank check. The points server may also handle points transactions similarly to the manner in which a financial server handles currency transactions, for example, by using similar security solutions. The points server may utilize alternative approaches due, for example, to regulatory issues.

Accordingly, in an implementation, when a user wins an auction and "buys" the online item, the buyer's points account at the points server is debited by the number of points the buyer bid, and the seller's points account is credited the same amount. When the points transfer is verified, the game server receives confirmation and proceeds with the transfer of the use of the game item from the seller to the buyer through updates to game data and user accounts.

Figure 4:
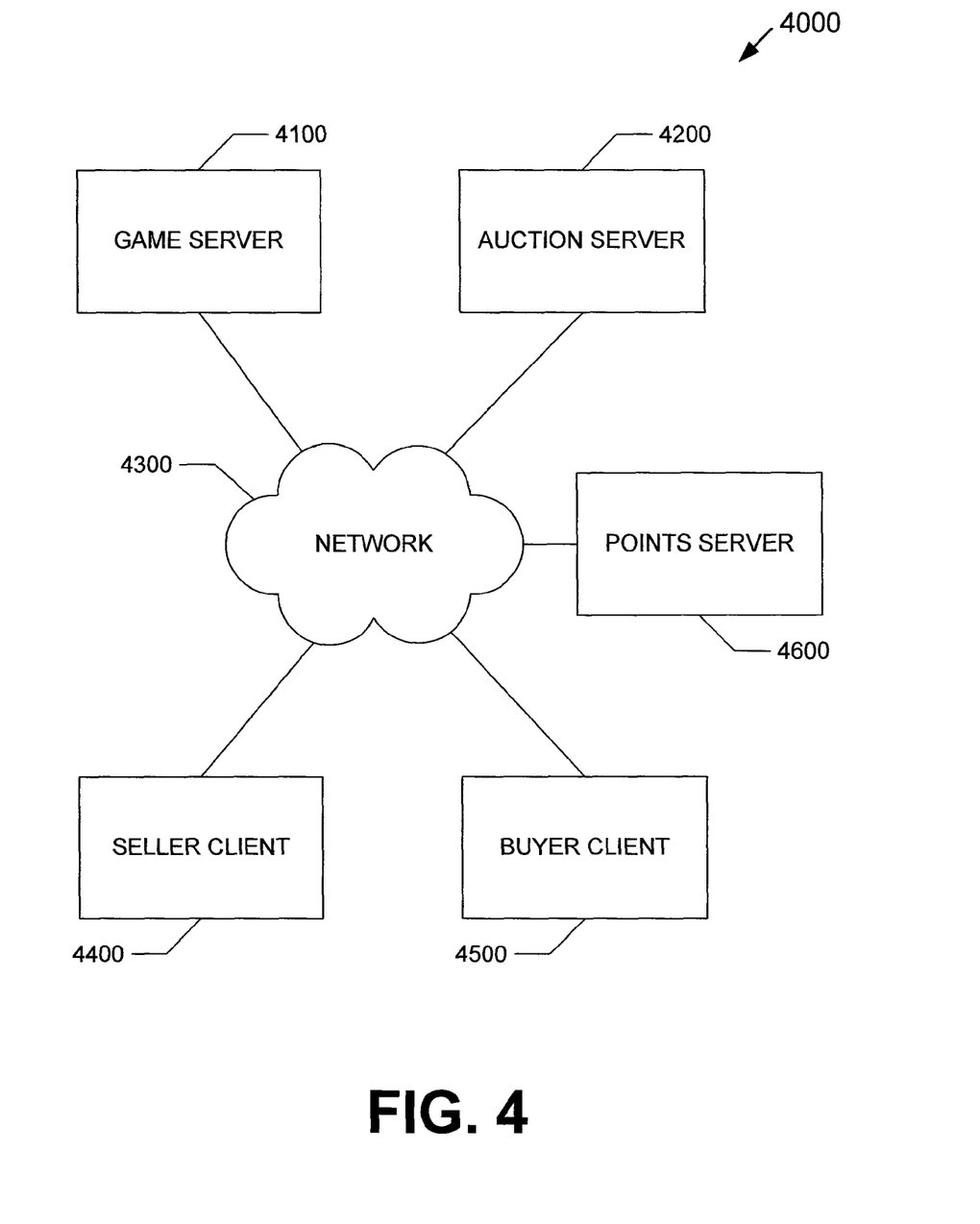
FIG. 4 shows a representation of another implementation of a system for transferring privileges including a points server.

FIG. 4 shows a representation of another implementation of a system 4000 for transferring privileges including a points server. A game server 4100 is connected to an auction server 4200 through a network 4300, similar to the implementation shown in FIG. 1, and a points server 4600 is connected to both the game server 4100 and the auction server 4200 via the network 4300. A seller client 4400 and a buyer client 4500 are also connected to the network 4300. The game server 4100, auction server 4200, network 4300, seller client 4400, and buyer client 4500 function similar to the game server 1100, auction server 1200, network 1300, seller client 1400, and buyer client 1500 as described in relation to FIG. 1.

The points server 4600 is a network server system including computer hardware and software to support the operation of and storage for an online service, such as that used to support online transactions involving non-financial items such as points, game characters, items of game equipment, online privileges, online certificates, and representations of physical items. The points server 4600 supports transactions involving buyers and sellers, and provides an interface for connections to the auction server 4200 through the network 4300. In one implementation, the points server 4600 stores data representing account balances of non-financial items. In another implementation, the points server 4600 additionally stores data representing financial balances. A buyer or seller has at least one corresponding user account stored on the points server 4600. In one implementation, the points server 4600 includes interfaces for providing information to a user regarding the user's account, including preference information, account balances, payment transaction histories, and payment transaction statuses.

As shown in FIG. 4, the game server 4100, auction server 4200, and points server 4600 are depicted as separate components which may be owned and operated separately. In other implementations, different combinations may also be used. For example, any two, or all three, of the game server 4100, auction server 4200, and points server 4600 may be commonly owned and configured as a single system, each presenting separate interfaces depending on the transaction being processed. In one such implementation, the points server 4600 and game server 4100 interact, so that points may be earned at the game server 4100, such as through game play or online participation in events or activities, are accounted for at the points server 4600, hosted on the same system as the game server 4100. For example, the points earned may be credited to the user's account on the points server 4600. In another implementation, the auction server 4200 and the game server 4100 are hosted on a single system. In yet another example, the auction server 4200 and the points server 4600 are hosted on a single system. It will be appreciated that each configuration may provide particular benefits, depending upon requirements. For example, it may be beneficial to co-locate the auction server 4200 and the points server 4600 in order to expedite sale transactions. Or, it may be necessary to operate the points server 4600 separately because it is owned by an entity different than the owner of the auction server 4200.

In another example, the points server 4600 supports the exchange of points for real currency (e.g., U.S. dollars), either directly or through another financial service provider (not shown). In this way, auctions may be conducted for points and, the points may subsequently be purchased or sold for real currency.

In an implementation, points are awarded for subscription payments to a points service, or to another affiliated service. Points may be earned, for example, for using a "points credit card," where points are awarded to a user based on purchases, similar to an airline frequent flyer miles card. Points may be awarded to an account holder for online activity, such as for achievements in playing an online game. In this example, the online game may be provided by the game server 4100.

In one implementation, the points server 4600 facilitates a transfer of exchange (e.g., game points) from the buyer to the seller. In another implementation, the points server 4600 uses the points accounts to store financial information, such as credit card and banking information, to facilitate a transfer of money or direct payment. In another implementation, the points server 4600 credits and debits balances of the seller's and buyer's points accounts or provides the information to the game server 4100 or the auction server 4200 for crediting and debiting balances of the seller's and buyer's points accounts (e.g., to be applied against fees for using the online game or for additional services provided by the game server, such as enhanced privileges or storage). In another implementation, the payment is facilitated using game currency for the game provided by the game server 4200 and so the game server 4200 confirms the "payment" (e.g., the points server 4600 is acting as an out-of-game facilitator or second interface for an in-game economy). In another implementation, the points server 4600 deducts a service fee from a payment and retains that fee.

Figure 2B:
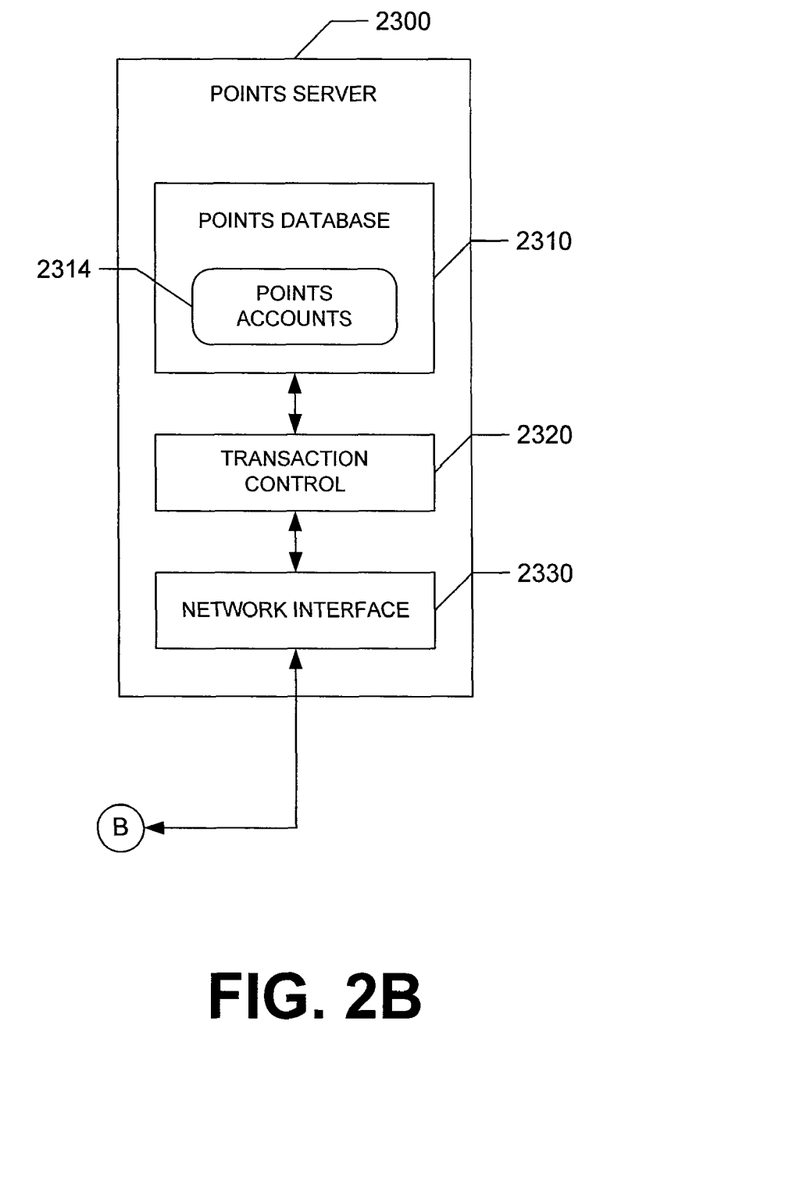
FIG. 2B shows a functional block diagram of one implementation of a points server.

FIG. 2B shows a functional block diagram of one implementation of a points server 2300. In the points server 2300, a points database 2310 is a storage system, including, for example, one or more hard drives (e.g., a RAID system). The points database 2310 stores data used for one or more online non-financial payment transactions. Some data represent user points accounts 2314 for users registered with the points server 2300, such as an identifier, name, security information, billing information, financial account information (e.g., banking, credit card, online funds transfer such as PayPal™), and non-financial account information, e.g., points balances and online item inventories.

The transaction control module 2320 controls the operation of the online transactions supported by the points server 2300. In one implementation, the transaction control module 2320 is integrated with the general control system which controls the operation of the points server 2300 (not shown in FIG. 2B). The transaction control module 2320 includes hardware and software to store and execute the transaction software providing the online non-financial and financial transactions handled by the points server 2300. The transaction control module 2320 may access and modify data stored in the points database 2310 during the course of executing the transaction software.

The examples recited above describe a points server 2300 used generally for certain non-financial exchanges. Additionally, transactions for other online items may be performed, similarly to the way a barter system works. For example, in one such configuration, a character for a game may be exchanged for an item of equipment from a different game. Or, a game item may be exchanged for an online privilege such as access to a restricted online resource (e.g., music, video, and other types of content) for a period of time. These online items may be held in accounts with points in a points server 2300. Alternatively, the items may be held in separate accounts (on the same server, or on a different server), and may be used separately or together with points.

In another example, non-financial items include online certificates or representations of physical items, such as a book, an article of clothing, or any tangible item. In this case, the physical item corresponding to the certificate is sent to, or collected by, the other party after the transaction is completed. Alternatively, or in addition, an escrow or third party holding solution may be utilized to aid in securing the transaction.

In yet another implementation, the points server 2300 supports a combination of payment methods including currency, online items, and physical items. Additional variations and implementations are also possible. For example, in such an implementation, the online items could be music or video resources, either to be auctioned or to be used for exchange (i.e., as a "payment"). In another implementation, the transfer is based on a straight "sale" mechanism, rather than an auction or bidding process.

As shown in FIG. 3B, after closing the auction, the auction server confirms payment from the buyer to the seller, block 3160.

Figure 5:
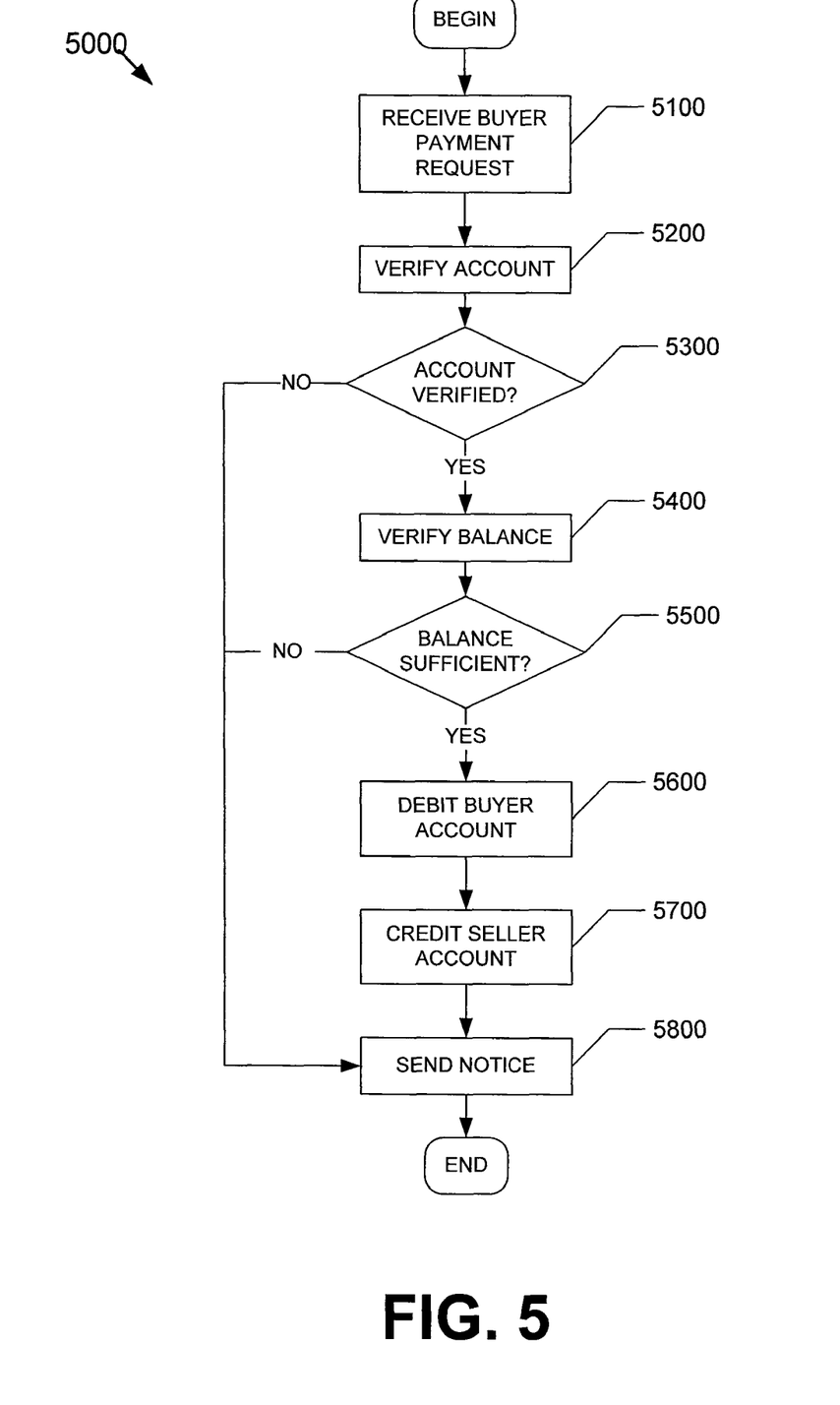
FIG. 5 shows a flowchart of an implementation of confirming a payment.

FIG. 5 shows a flowchart 5000 of an implementation of a transaction confirming a payment at a points server. At block

5100, a payment request is received. The payment request is typically received from an auction server, though it may also be received from a game server, from another network server, or from one or more client devices involved in the auction of the item for which a payment is requested.

The request for payment is typically to compensate a seller in the form of a payment. Accordingly, the request is used to debit a non-financial item such as some number of points from an account belonging to the buyer.

Alternatively, or additionally, the request for payment may be to compensate a seller in the form of a barter. In an implementation, the non-financial item is an online game item, a character for a game, or an item of equipment from a different game, any of which would be "debited" from the buyer's account by removing (i.e., deleting) it for exchange with a seller. The non-financial item may also be an online privilege such as access to a restricted online resource (e.g., music, video, and other types of content) for a period of time. Similarly, entitlement to the online privilege would be "debited" from the buyer's account and "credited" to the seller's account.

As discussed above in relation to FIG. 4, a payment request may also involve a financial exchange. In an implementation, communications are made with a separate financial server to facilitate a financial exchange. For example, a financial exchange may be made for points, a game item, or an online privilege.

The buyer's account is verified, at block 5200. Verifying the account includes verifying account information, such as identifier, name, security information, billing information, financial account information, and non-financial account information, as discussed above in relation to FIG. 2B. If the account is determined (at block 5300) to be unverified, a notice may be sent, at block 5800, indicating that the status of the payment transaction is a verification failure. If the account is determined (at block 5300) to be verified, the account balance(s) is(are) verified, at block 5400.

In one implementation, this verification is performed to ensure that the buyer has a balance sufficient to complete the exchange with the seller. If the account balance is determined (at block 5500) to be insufficient, a notice may be sent, at block 5800, indicating that the status of the payment transaction is an account balance insufficiency. If the account balance is determined to be sufficient, the buyer's account is debited, at block 5600, and the seller's account is credited accordingly, at block 5700. A notice may be sent, at block 5800, regarding a payment transaction status, including an indication that the payment transaction has completed. The notice may be sent, at block 5800, to either, or both, the buyer and seller. The notice may be sent, at block 5800, to an auction server and/or a game server to be relayed to either, or both, the buyer and seller.

The various implementations of the present invention are realized in electronic hardware, computer software, or combinations of these technologies. Some implementations include one or more computer programs executed by a programmable processor or computer. For example, referring to FIG. 4, the game server 4100, auction server 4200, and points server 4600 each include one or more programmable processors. In general, each computer includes one or more processors, one or more data-storage components (e.g., volatile or non-volatile memory modules and persistent optical and magnetic storage devices, such as hard and floppy disk drives, CD-ROM drives, and magnetic tape drives), one or more input devices (e.g., mice and keyboards), and one or more output devices (e.g., display consoles and printers).

The computer programs include executable code that is usually stored in a persistent storage medium and then copied into memory at run-time. The processor executes the code by retrieving program instructions from memory in a prescribed order. When executing the program code, the computer receives data from the input and/or storage devices, performs operations on the data, and then delivers the resulting data to the output and/or storage devices.

Various illustrative implementations of the present invention have been described. However, one of ordinary skill in the art will see that additional implementations are also possible and within the scope of the present invention. For example, while the above description focuses on implementations for transacting non-financial exchanges for game items, the transactions can also be used for transferring privileges associated with other types of data, such as shopping privileges, or access to audio or video data. Similarly, the transactions may be presented as in-game or out-of-game services, or as a combination thereof. Alternative system configurations may also be used, such as those based on distributed processing and/or storage systems.

Accordingly, the present invention is not limited to only those implementations described above.

What is claimed is:

1. A method of transferring privileges, comprising:

selecting by a seller client a game item in an online game provided by a game server;

representing the game item by item data stored in a game database connected to the game server, and associating the item data having an associated privilege in the online game with a first user account;

retrieving by the game server the item data from the game database;

transferring by the game server the item data and a first user identifier of the first user account to an auction server;

disabling by the game server the item data stored in the game database so that the privilege associated with the item data is no longer available in the online game;

storing by the auction server the transferred item data and the first user identifier in an auction database connected to the auction server;

presenting by the auction server an auction for the game item at the auction server;

accepting by the auction server one or more bids at the auction server for the game item;

determining by the auction server a winning bid for the game item from among accepted bids, the winning bid indicating a second user identifier and the second user identifier corresponding to a second user account with the game server;

transferring by an online service company one or more non-financial items based on the winning bid from an account indicated by the second user identifier to an account indicated by the first user identifier, wherein the online service company connects to and controls both the game server and the auction server so that a second user associated with the second user account is assured of transfer of the game item for said one or more non-financial items;

updating by the game server the item data stored in the game database so that the item data is associated with the second user account; and enabling by the game server the item data stored in the game database so that the privilege is available in the online game.

2. The method of claim 1, wherein the one or more non-financial items include points stored in the account indicated by the second user identifier.

3. The method of claim 1, wherein the one or more non-financial items include a game item stored in the account indicated by the second user identifier.

4. The method of claim 1, wherein the one or more non-financial items include an online privilege stored in the account indicated by the second user identifier.

5. The method of claim 1, wherein the one or more non-financial items include an online certificate stored in the account indicated by the second user identifier.

6. The method of claim 1, wherein the one or more non-financial items include a representation of a physical item stored in the account indicated by the second user identifier.

7. A non-transitory computer-readable storage medium storing a computer program for use in transferring online privileges, the program comprising executable instructions that cause a computer to:

select a game item in an online game provided by a game server;

represent the game item by item data stored in a game database connected to the game server, and associate the item data having an associated privilege in the online game with a first user account;

retrieve the item data from the game database;

transfer the item data and a first user identifier of the first user account to an auction server;

disable the item data stored in the game database so that the privilege associated with the item data is no longer available in the online game;

store the transferred item data and the first user identifier in an auction database connected to the auction server;

present an auction for the game item at the auction server;

accept one or more bids at the auction server for the game item;

determine a winning bid for the game item from among accepted bids, the winning bid indicating a second user identifier and the second user identifier corresponding to a second user account with the game server;

transfer one or more non-financial items based on the winning bid from an account indicated by the second user identifier to an account indicated by the first user identifier, wherein an online service company connects to and controls both the game server and the auction server so that a second user associated with the second user account is assured of transfer of the game item for said one or more non-financial items;

update the item data stored in the game database so that the item data is associated with the second user account; and enable the item data stored in the game database so that the privilege is available in the online game.

8. The non-transitory computer-readable storage medium of claim 7, further comprising building an auction profile for the game item by the auction server prior to accepting one or more bids.

9. The non-transitory computer-readable storage medium of claim 7, further comprising enabling a user identified by the first user identifier to access the auction profile and set desired auction parameters including length of the auction, a starting price, a reserve price, and an instance purchase price.

* * * * *